(No Model.) 2 Sheets—Sheet 1.
W. F. HALL.
SELF FEEDER AND BAND CUTTER FOR THRASHING MACHINES.
No. 523,399. Patented July 24, 1894.
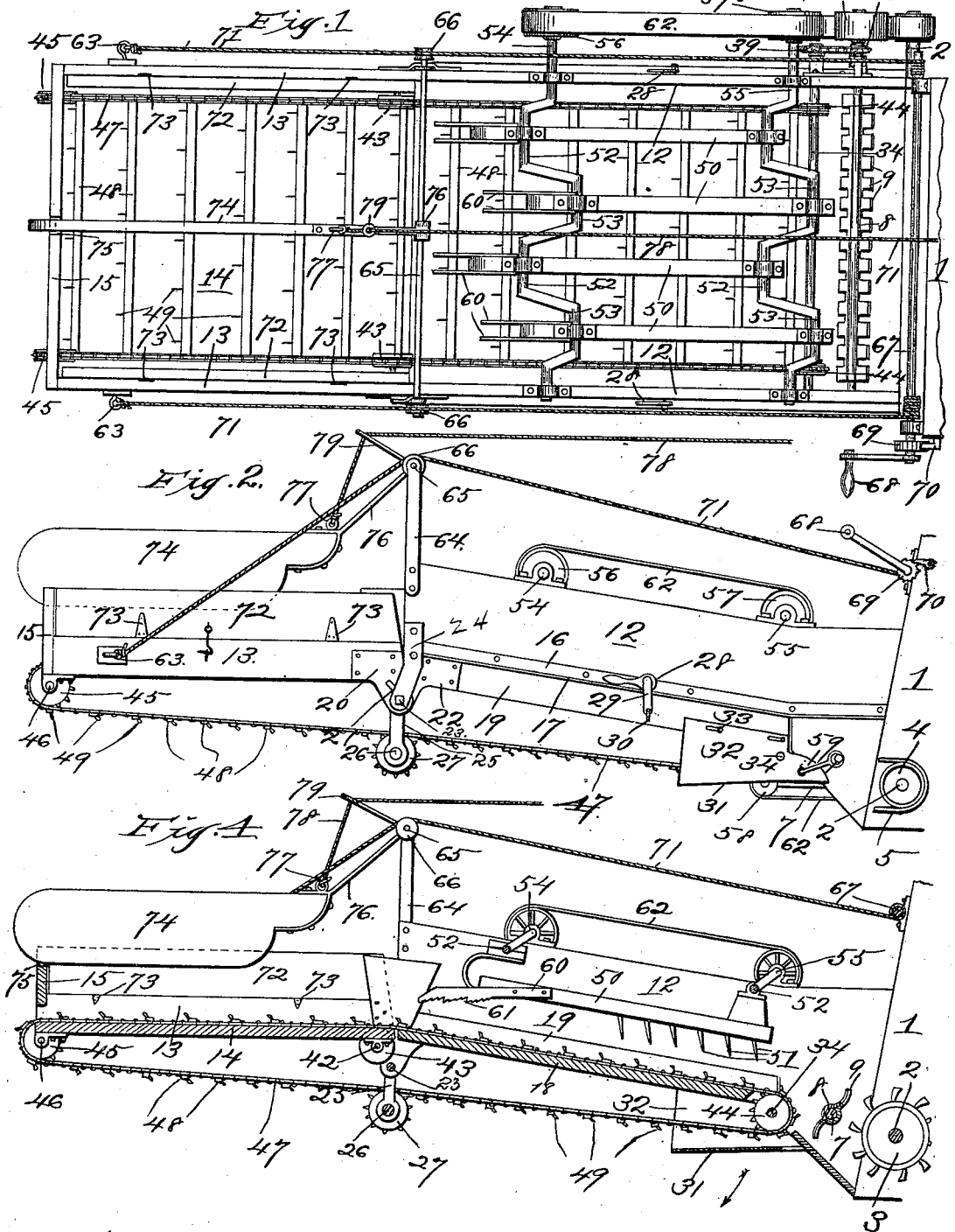
Witnesses
M. P. Smith
G. L. Thorpe
Inventor:
Wm. F. Hall.
By Higdon & Higdon
Att'ys.
THE NORRIS PETERS CO., PHOTO-LITHO., WASHINGTON, D. C.

(No Model.) 2 Sheets—Sheet 2.
W. F. HALL.
SELF FEEDER AND BAND CUTTER FOR THRASHING MACHINES.
No. 523,399. Patented July 24, 1894.
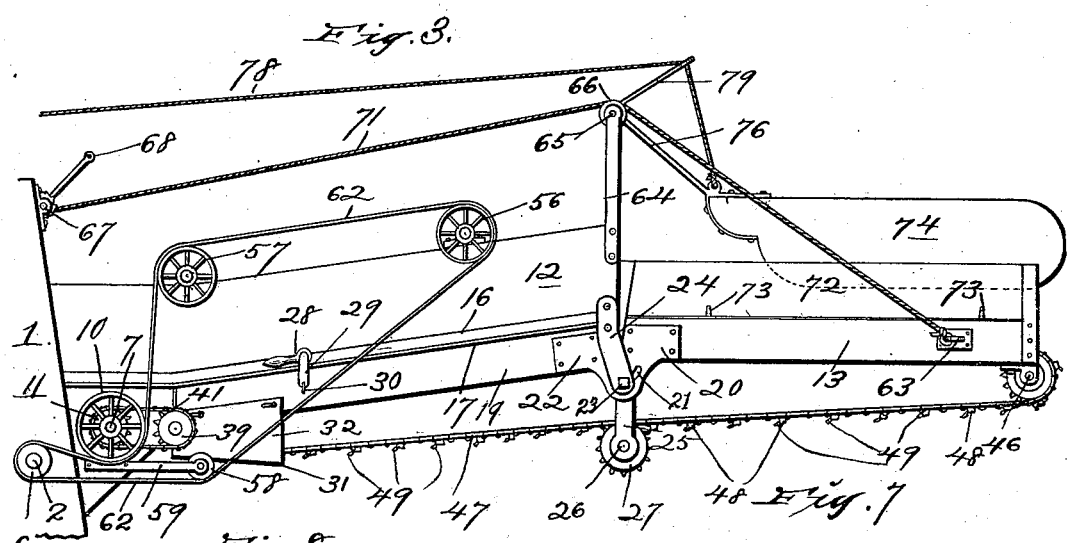
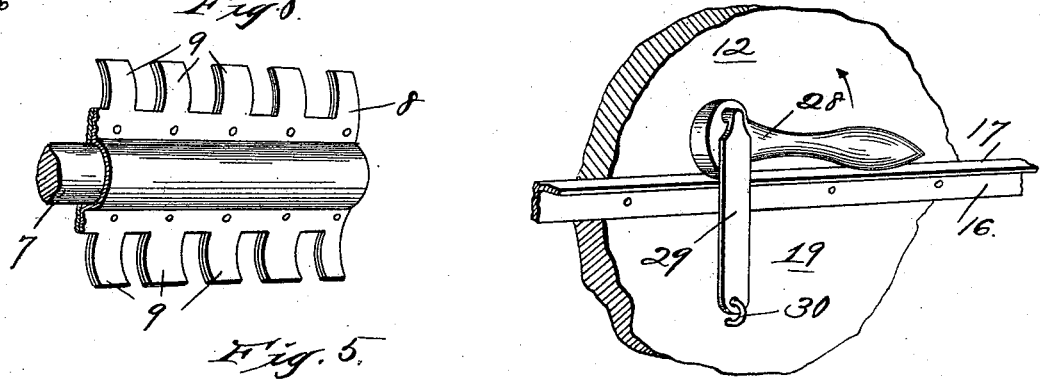
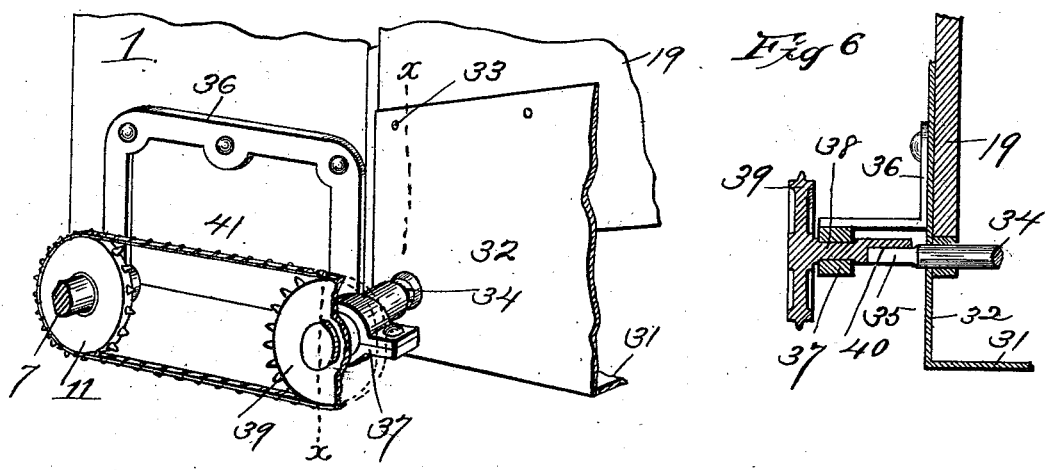
Witnesses:—
Inventor:
Wm. F. Hall,
By Higdon & Higdon
Att'ys.

UNITED STATES PATENT OFFICE.

WILLIAM F. HALL, OF RAYTOWN, MISSOURI.

SELF-FEEDER AND BAND-CUTTER FOR THRASHING-MACHINES.

SPECIFICATION forming part of Letters Patent No. 523,399, dated July 24, 1894.

Application filed October 9, 1893. Serial No. 487,577. (No model.)

*To all whom it may concern:*

Be it known that I, WILLIAM F. HALL, of Raytown, Jackson county, Missouri, have invented certain new and useful Improvements in Self-Feeders and Band-Cutters for Thrashing-Machines, of which the following is a full, clear, and exact description, reference being had to the accompanying drawings, forming a part hereof.

My invention relates to self-feeders and band cutters for thrashing machines, and has for its objects, to provide improved means whereby the feeder may be raised or lowered to and held at any desired position; to provide a divider or deflector so that the grain may be fed simultaneously upon each side of the feeder positively and reliably, and means to elevate to and hold said divider or deflector in an inoperative position.

A further object of the invention is to so construct the rear end of the feeder-frame that the rear half or portion of the bottom thereof and the rear portion of the bottom feed mechanism may be lowered to give access to the cylinder of the thrasher when necessary or desirable, and furthermore to produce a self-feeder which is simple, strong, durable and comparatively inexpensive of construction.

With these objects in view, my invention consists in certain peculiar and novel features of construction and combinations of parts, as hereinafter specified and pointed out particularly in the claims.

Referring to the drawings, which accompany and illustrate the invention,—Figure 1, is a top plan view of a self-feeder and band cutter constructed in accordance with my invention. Fig. 2, is a side elevation of the same. Fig. 3, is a view of the opposite side of the same. Fig. 4, is a central longitudinal sectional view of the same, and showing the divider or deflector in side elevation. Fig. 5, is a sectional perspective view of the end of the feeder which meets the end of the thrasher. Fig. 6, is a vertical sectional view taken on the line *x—x* of Fig. 5. Fig. 7, is a detail perspective view of the cam lever for supporting the pivotal portion of the feeder in operative position. Fig. 8, is a detail perspective view of the beater.

In the said drawings, 1 designates one end of a thrashing machine, and extending transversely therethrough is a shaft 2 upon which the thrasher cylinder 3 is mounted. Secured upon the projecting end of this shaft is a belt pulley 4 which is connected through the medium of a belt 5 with the engine or other power mechanism not shown. A belt pulley 6 is also mounted upon the opposite end of said shaft, the object of which is hereinafter explained.

Extending transversely of the thrasher and arranged slightly upward and outward of the thrasher cylinder is a shaft 7 upon which the beater 8 is mounted; this beater consisting of a series of fingers or projections 9 arranged a suitable distance apart and adapted to operate between the teeth of the cylinder in the usual manner.

Mounted upon the projecting end of the shaft 7 is a belt wheel 10, and mounted a slight distance inward of this wheel is a sprocket wheel 11. The self-feeder frame consists of the parallel and longitudinally extending sides 12, and a rectangular frame which is composed of the sides 13 which form a continuation of the sides 12 practically, the bottom 14 uniting these sides 13, and the end bar 15 uniting the sides 13 at their outer ends. Secured to the sides 12 at their lower margins are the angle-plates 16; these plates being arranged so that the continuous horizontal flange 17 shall project outwardly. A portion of the feeder frame consists of the rectangular bottom 18, which extends from the inner margin of the bottom 14 to within a suitable distance of the end of the cylinder, and the sides 19 projecting upwardly from the side margins of the bottom 18 and fitting snugly and vertically beneath the sides 12. In order to support this section in its operative position, a bearing plate 20 is bolted or otherwise secured to the inner ends of the sides 13, and projecting downwardly a suitable distance is slotted at 21. A bracket 22 is also bolted to the adjacent outer corners of the sides or sills 19, and extending transversely of the machine and passing through the slots 21 and the bearing plates 22 is a shaft 23; thus forming a hinge connection between the stationary portion of the frame and the movable section composed of the bottom 18 and the sides 19, which supports its outer end. In order to provide an additional support depending bearing plates 24 are provided; these plates 24 being bolted to the forward and outer sides of the sides 12 and having the outer ends of the shaft 23 journaled therein.

Depending from the shaft 23 near each end is a bearing bracket 25 in which is journaled the transverse shaft 26 carrying idler sprockets 27 for a purpose hereinafter explained.

In order to support the free or inner end of the hinge section in its operative position, I provide the cam levers or eccentrics 28 which are mounted upon the horizontal flanges 17 of the sides 12. These levers 28 are pivotally mounted upon the free end of link-plates 29, and said link-plates in their operative position extend vertically downward and are pivotally secured to the outer sides of the sills 19 by the staples 30. From this construction it will be seen that when the lever occupies the position shown in Fig. 7, the hinge section is held firmly against the lower margin of the sides 12, and when it is desired to lower said hinge section to have access to the cylinder of the thrasher or the beater, by operating the lever in the direction of the arrow, the tension upon the link plate 29 will be removed and said plate may be moved pivotally outward so as to withdraw the cam lever from its position upon the flange; and thereby allowing the hinge section to swing pivotally downward as indicated by arrow Fig. 4.

One end of the bottom 18 as before stated extends to within a suitable distance of the adjacent end of the thrasher, and is provided with a guard and carrying plate consisting of the bridge portion 31 extending transversely of the machine, and the vertically and upwardly projecting sides or ends 32 which are bolted to the sides 19 as shown at 33.

Extending transversely of the machine and about midway the space between the beater and the adjacent end of the bottom 18 is a shaft 34; said shaft being journaled near its opposite ends in the sides or ends 32 of the guard 31, and one end of this shaft is squared as shown at 35 and for a purpose hereinafter explained.

From the foregoing it will be seen that when the hinge section is moved pivotally downward the shaft 34 necessarily is carried thereby, and as this shaft carries the discharge end of the bottom feed mechanism a peculiar connection which is hereinafter explained is necessary to be made with the rear or power transmitting connections, so that the shaft may be disconnected therewith without necessitating the removal of any of the power transmitting belts or chains from the belt-pulleys or sprockets. In order to accomplish this, an angle bracket 36 at one side of the machine is provided with a forwardly projecting bearing-box 37 in which the cylindrical stub-shaft 38 of sprocket wheel 39 is revolubly and permanently mounted. The inner end or portion of the stub shaft is provided with a squared recess 40 in which is adapted to fit snugly the squared portion 35 of the shaft 34. It will now be seen that when the hinge section is in its elevated or operative position and the squared portion 35 of the shaft 34 is within the recess 40 that the shaft 34 and the sprocket wheel 39 is rigidly connected, so that when the sprocket wheel 39 is rotated the shaft 34 will be rotated also. It will further be seen that when the sprocket wheel 39 occupies such a position that the recess 40 is disposed downwardly, by operating the cam levers 28 and disconnecting the same from the horizontal flange 17, the squared portion 35 of the shaft 34 by reason of gravity will be disconnected from the recess 40 as will be readily understood. The bracket or angle-plate 36 carrying the sprocket wheel 39 also forms a journal for one end of the beater shaft 7 as shown more clearly in Fig. 5, and connecting the beater shaft sprocket 11 with the sprocket 39 is an endless chain 41. Extending transversely of the under side of the bottom 14 and adjacent to its inner margin is a shaft 42, and mounted upon this shaft and having their upper periphery projecting a slight distance through and above the bottom 14 and within the sides 13 are a pair of sprocket wheels 43. A similar pair of sprocket wheels 44 are mounted upon the shaft 34, and a similar pair of sprocket wheels 45 are mounted upon a shaft 46 journaled transversely of the receiving or outer end of the bottom 14. These sprocket wheels 43—44 and 45 are arranged in longitudinal alignment, and the sprocket idlers 27 are also arranged in the same vertical plane. A pair of endless feed-chains 47 engage these sprockets, and are connected by the cross-strips 48 from which project the fingers 49. The fingers 49 of that portion of the chain traveling over the bottom portions 14 and 18 project obliquely upward and away from the thrasher cylinder, so that said fingers will not become entangled in the grain which they feed beneath the beater, and tend to draw said grain through the space occupied by the inner end of the bottom feed mechanism. The top-feed mechanism is composed of a series of longitudinally extending bars 50 from which project downwardly a series of points or fingers 51, and these bars 50 are mounted upon alternately and oppositely projecting sections 52 and 53 of a pair of transversely extending crank shafts 54 and 55, and mounted upon the outer ends of said crank shafts are the belt pulleys 56 and 57 respectively. A tension pulley or idler 58 is carried by a bar 59 which is secured to the adjacent portion of the thrasher.

In order to communicate motion to the bottom feed mechanism composed of the endless chains and the cross-strips, and also to the reciprocatory bars 50 comprising the top feed mechanism and the band-cutters 60 carried by said reciprocatory bars and provided with saw teeth 61 at their lower edges, I provide an endless belt 62. This belt 62 passes around the belt pulley 6 of the thrasher shaft, and thence extends forwardly and has its upper portion in contact with the under side of the belt wheel 10 of the beater shaft, and its lower portion in contact with the under side of the idler pulley 58, and is then carried around the belt-pulleys 56 and 57 as shown clearly in Fig. 3. It will now be seen that when the thrasher cylinder is operated, the belt 62 communicates motion to the top feed mechanism, and the sprocket chain 41 communicates motion through the medium of the sprocket wheel 39 to the bottom feed mechanism. In order to adjust the feeder to stacks of varying heights, a plate having an eye 63 is secured to each of the sides 13 near their forward ends, and a pair of bars 64 are secured to the receiving end of the sides 12, and these bars have journaled therein the opposite ends of a transversely extending shaft 65 upon which is mounted near each end a grooved pulley 66. A shaft 67 extends transversely of the receiving end of the thrasher-frame proper, and mounted upon one end of said shaft is a crank arm having a handle 68. Mounted also upon the end of the shaft adjacent to the crank-handle is a ratchet wheel 69, and this ratchet wheel is engaged by a gravity pawl 70. A pair of ropes or flexible connections 71 are secured at one end in the eyes 63, and extending longitudinally are guided over the grooved pulleys 66 and have their opposite ends secured upon the shaft 67.

It will now be seen by operating the crank handle 68 that the cords or flexible connections 71 will be wound or unwound upon the drum shaft 67, and that the front portion of the self-feeder consisting of the bottom 14 and sides 13 will be raised or lowered; the slot 21 of the bearing plates 20 operating pivotally upon the shaft 23. In order to increase the depth or capacity of the front portion of the feeder, a pair of boards 72 are hinged at 73 to the upper margins of the side-boards 13, and may be moved outwardly when desired, so as to form guide boards to assist the grain to its proper position when tossed carelessly thereon. Extending centrally and longitudinally of the front portion of the feeder is the divider or deflector board 74, and this guider or deflector board rests at its forward and outer end in the notch or recess 75 formed in the upper edge of the end board 15, and is supported at its inner end by the bracket 76 which is pivotally mounted upon the transverse shaft 65. This bracket 76 is provided with an eye 77 in which is secured the forward end of a cord or flexible connection 78 which extends rearwardly toward the thrasher, and is guided through the eye of an arm 79 projecting upwardly and outwardly and forming preferably a part of the bracket 76.

By pulling upon the cord or connection 78 the divider board may be raised to an inoperative position, and may be held in such position by securing the rear end of the cord in any desired manner, and when the cord is released the divider by gravity assumes the position shown in the drawings.

A recapitulation of the operation of the machine will not be necessary, it being only necessary to state that the grain is fed transversely upon each side of the deflector, and carried rearwardly by the bottom feed mechanism beneath the band-cutters 60 which sever the bands, and the grain is then carried onward and is drawn down beneath the beater by the top and bottom feed mechanism and thence passes to the thrasher cylinder.

Having thus described my invention, what I claim as new, and desire to secure by Letters Patent, is—

1. In a self-feeder and band-cutter, the combination with a stationary inner portion, consisting of a pair of side-boards, and flanges projecting therefrom, of a lower portion, forming the bottom of the first-mentioned portion, and pivotally connected therewith, a pair of cam levers, mounted upon the said flanges, and plates carried by the pivotal portion, and eccentrically and pivotally connected to the segmental heads of said levers, substantially as set forth.

2. In a self-feeder and band-cutter, the combination with a stationary inner portion having flanges, and having a pair of plates, and a cross-bolt connecting said plates, of an outer portion pivotally mounted upon said cross-bolt, and a second inner portion, also pivotally mounted upon said cross-bolt and forming the bottom of the stationary inner portion, and a pair of cam-levers, detachably mounted upon the flanges of the stationary inner portion, and linked to the pivotal inner portion, substantially as set forth.

3. In a self-feeder and band-cutter, the combination with a stationary inner portion, having a bearing plate, and a sprocket-wheel having a recessed stub-shaft, which is journaled in said bearing plate, of a pivotal portion forming the bottom of the stationary inner portion, a shaft carried thereby, and provided with a squared end engaging the recess of the stub-shaft, and means to hold the squared portion within the said recess, and support the pivotal portion in its operative position, substantially as set forth.

4. In a self-feeder, the combination with a stationary inner portion consisting of a pair of side-boards, and an outer portion, pivotally carried by said stationary inner portion a bracket or plate carried by the stationary inner portion, and a sprocket wheel having a recessed stub-shaft carried by said bearing plate or bracket, of a pivotal portion forming the bottom of the inner stationary portion, a shaft carried thereby having a squared end engaging the recess of the stub-shaft, and means to hold said squared portion within the recess and to support the pivotal portion to its operative position, and sprocket wheels mounted upon said shaft, guide sprocket wheels carried by the outer portion, and a bottom feed mechanism guided over said sprocket wheels, and the sprockets of the shaft of the outer portion, and the sprockets of the shaft carried by the pivotal inner portion, and a continuously moving chain, engaging to the stub-shaft sprocket wheel substantially as set forth.

In testimony whereof I affix my signature in the presence of two witnesses.

WILLIAM F. HALL.

Witnesses:
MAUD FITZPATRICK,
M. P. SMITH.